United States Patent [19]

Hamaguchi et al.

[11] Patent Number: 4,734,859

[45] Date of Patent: Mar. 29, 1988

[54] METHOD AND APPARATUS FOR HANDLING TRANSACTION SLIPS INCLUDING ILLEGIBLE CHARACTERS

[75] Inventors: Tsuyoshi Hamaguchi, Hadano; Ken Onomoto, Kawasaki; Takashi Nakamura, Tokyo; Yasuo Okuma, Seto, all of Japan

[73] Assignee: Hitachi, Ltd., Tokyo, Japan

[21] Appl. No.: 768,325

[22] Filed: Aug. 22, 1985

[30] Foreign Application Priority Data

Aug. 24, 1984 [JP] Japan ................. 59-176482

[51] Int. Cl.⁴ ............................................. G06F 15/30
[52] U.S. Cl. ..................................... 364/408; 364/401; 235/375; 235/379
[58] Field of Search ................................ 364/400–401, 364/406, 408, 550–552; 235/375, 379–382

[56] References Cited

U.S. PATENT DOCUMENTS

| | | | |
|---|---|---|---|
| 3,487,905 | 1/1970 | James, Sr. ................ | 364/408 X |
| 4,086,475 | 4/1978 | Churchill .................. | 235/382 X |
| 4,264,808 | 4/1981 | Owens et al. ............. | 235/379 |
| 4,438,326 | 3/1984 | Uchida ..................... | 235/379 |
| 4,454,610 | 6/1984 | Sziklai ...................... | 235/380 X |
| 4,546,240 | 10/1985 | Imamichi .................. | 235/379 |
| 4,568,936 | 2/1986 | Goldman .................. | 235/380 X |

FOREIGN PATENT DOCUMENTS 8402597 7/1984 PCT Int'l Appl. ................. 364/408

Primary Examiner—Gary V. Harkcom
Attorney, Agent, or Firm—Antonelli, Terry & Wands

[57] ABSTRACT

In a transaction processing system in which a plurality of terminal devices are connected to a common transmission line to carry out transactions on the basis of the contents of transaction slips read out by the terminal devices, a transaction can be continued even when misreading or reject is detected in the results of reading of a transaction slip. When misreading or reject is detected, data read out from the transaction slip are transferred to a specified terminal devices to be corrected, complemented, confirmed, etc., and, after approval of the transaction, the transaction is executed.

10 Claims, 7 Drawing Figures

FIG. 4

| WITHDRWAL SLIP | | |
|---|---|---|
| ACCOUNT NO | | DATE |
| AMOUNT | | |
| NAME | | REGISTERED STAMP |

FIG. 7

| ID NO. | TRANSACTION CONDITIONS |
|---|---|
| 01 | WITHDRAWAL ≧ ¥ 200,000 |
| 02 | USER ≠ CUSTOMER |
| 03 | ACTUATION TIME ≧ 3 MIN. |
| 04 | NUMBER OF TIMES OF CANCEL BUTTON DEPRESSION ≧ 3 |
| | |

METHOD AND APPARATUS FOR HANDLING TRANSACTION SLIPS INCLUDING ILLEGIBLE CHARACTERS

BACKGROUND OF THE INVENTION

1. Field of the Invention

This invention relates to a method and apparatus for handling transaction slips, and more particularly to a method and apparatus of the kind above described which facilitate input of transaction slips carrying characters hand-written by users on transaction slips.

2. Description of the Prior Art

For the recognition of hand-written characters on a slip such as a transaction slip, an OCR (an optical character reader) has been used to analyze or distinguish characters in, for example, black color hand-written on the slip from the background in, for example, white color of the slip, thereby recognizing the hand-written characters and applying signals indicative of the characters as an input to a computer. However, in the case of, for example, a cash handling apparatus (automatic teller machine) installed in a bank or the like, many and unspecified users write characters by hand on transaction slips, and the rate of successful recognition of the hand-written characters is not sufficiently high. Therefore, in an enterprise such as a bank which handles money, the confidence of the bank may be lost in an extreme case due to such misreading resulting in improper rejection of some of the transaction slips. To deal with such a trouble, it has been required to locate or station a clerk for teaching users how to write necessary characters on transaction slips or it has been required to put up various notices.

SUMMARY OF THE INVENTION

With a view to solve such prior art problems, it is a primary object of the present invention to provide a method and apparatus for handling transaction slips carrying thereon characters which may contain illegible characters hand-written, the method and apparatus improving the reliability of the transaction processing system and lessening the load of the clerk who assists a user in the transaction procedure without requesting the user to effect reentry of characters on the transaction slip or cancelling the transaction even when the characters leading to misreading or other cause for rejection are hand-written by the user on the transaction slip.

In accordance with one aspect of the present invention which attains the above object, a plurality of terminal devices are connected to a common transmission line to carry out transactions on the basis of the contents of transaction slips read out by the terminal devices, data read out from a transaction slip in one of the terminal devices is transferred to a pre-specified terminal device when the former terminal device detects misreading or rejection of the transaction slip or finds that the contents of the transaction fall under predetermined transaction conditions, predetermined processing is carried out on the data, and the transaction after approval of the transaction is executed.

BRIEF DESCRIPTION OF THE DRAWINGS

FIG. 4 shows one form of a format of an ordinary deposit withdrawal slip.

FIG. 7 shows one form of a transaction condition table.

DESCRIPTION OF THE PREFERRED EMBODIMENTS

Preferred embodiments of the present invention will be described with reference to FIGS. 1 to 7.

Figure 2:
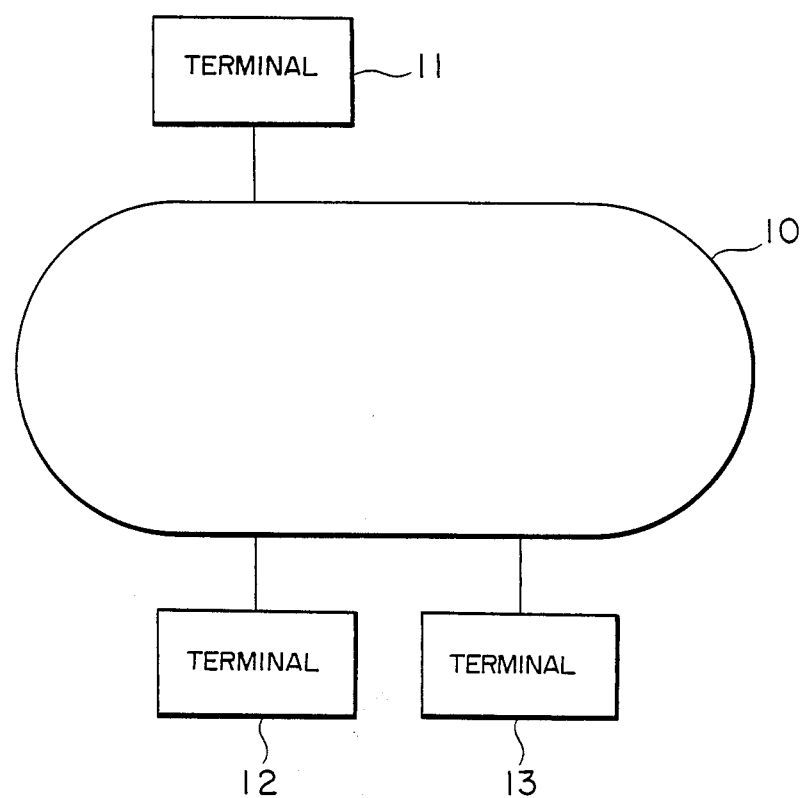
FIG. 2 is a diagrammatic view of a transaction processing system used for the practice of the first embodiment of the present invention.

FIG. 2 is a diagrammatic view showing a transaction processing system used for the practice of a preferred embodiment of the present invention.

Referring to FIG. 2, a plurality of terminal devices 11, 12 and 13 adapted for processing of transactions by users are connected to a common transmission line 10. Since high-speed transmission of a large amount of data and complex transmission control are required for the transmission line 10, each of the individual terminal devices 11, 12 and 13 may be connected to the transmission line 10 via a decentralized processing unit having an information transfer function. Also, a large-scale processing unit for storing data, managing and monitoring the system, etc. may be separately provided so that each of the individual terminal devices 11, 12 and 13 may function as a decentralized processing unit, such as a personal computer having an information transfer function added thereto.

Figure 3:
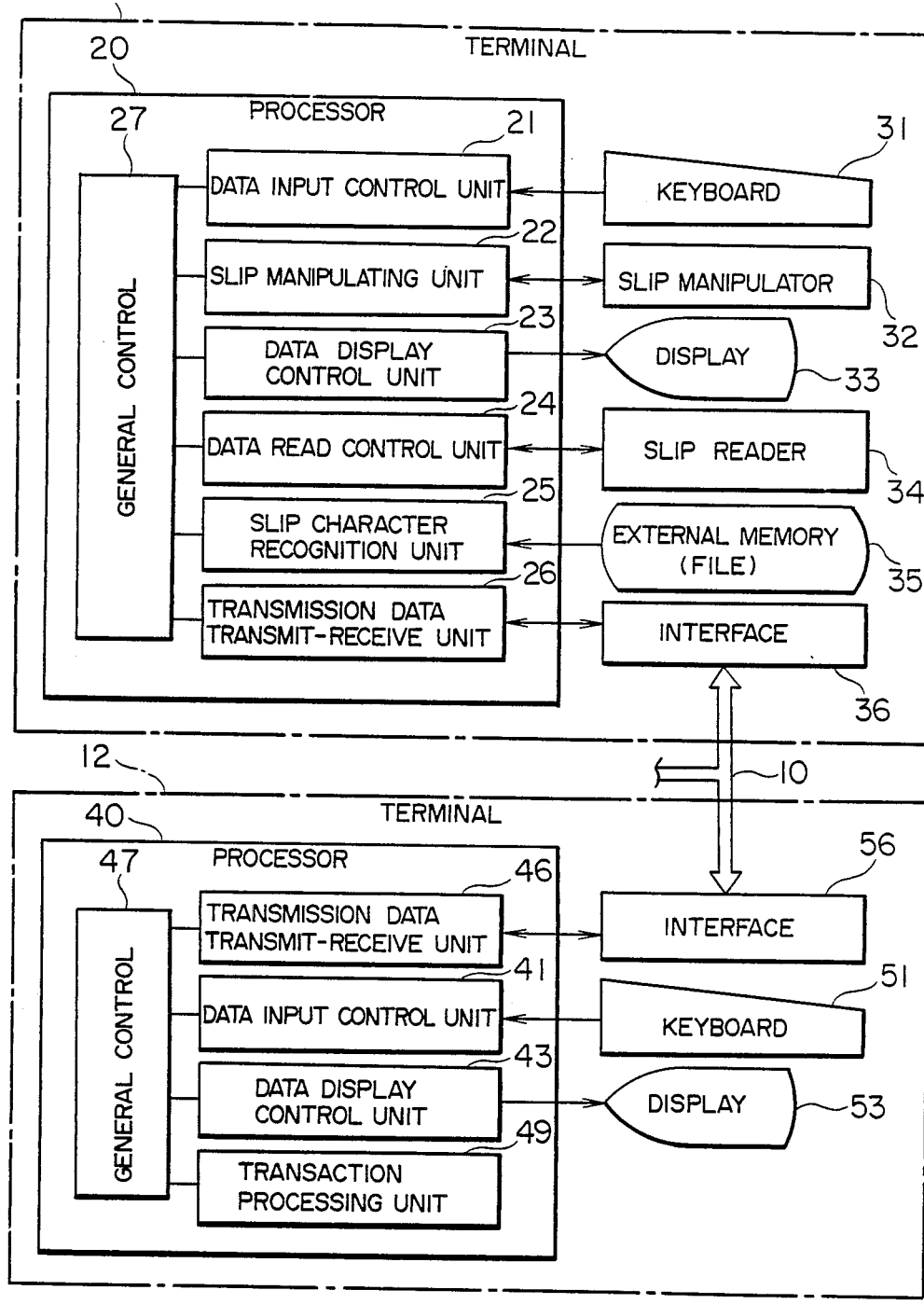
FIG. 3 is a block diagram showing the structure of the terminal devices employed in the first embodiment of the present invention.

Referring to FIG. 3 showing, in a block diagram, the structure of the terminal devices 11 and 12 employed in the first embodiment of the present invention, it is supposed that the terminal device 11 functions to receive a transaction slip on which characters are hand-written by a user, and the terminal device 12 applies an input for correcting and complementing the hand-written characters on the transaction slip. The terminal device 11 includes a processor 20, a keyboard 31, a slip manipulator 32, a display 33, a slip reader 34, an external memory (a file) 35 and an interface 36. The processor 20 includes a data input control unit 21, a slip manipulating unit 22, a data display control unit 23, a data read control unit 24, a slip character recognition unit 25, a transmission data transmit-receive unit 26 and a general control 27. The file 35 stores a character font dictionary, etc. for recognizing characters from slip data read out by the slip reader 34.

On the other hand, the terminal device 12 includes a processor 40, a keyboard 51, a display 53 and an interface 56. The processor 40 includes a data input control unit 41, a data display control unit 43, a transmission data transmit-receive unit 46, a general control 47 and a transaction processing unit 49. The transaction processing unit 49 processes a transaction on the basis of the contents of a transaction slip on which characters are written by the hand of a user. However, it may be replaced by a decentralized processing unit separately provided (or the aforementioned large-scale processing unit) when the data representing the contents of the slip can be sent out by way of the transmission line 10. Also, when the terminal device 12 is adapted to receive a transaction slip on which characters are hand-written by a user as in the case of the terminal equipment 11, the structure of this terminal device 12 is naturally the same as that of the terminal device 11.

Figure 1:
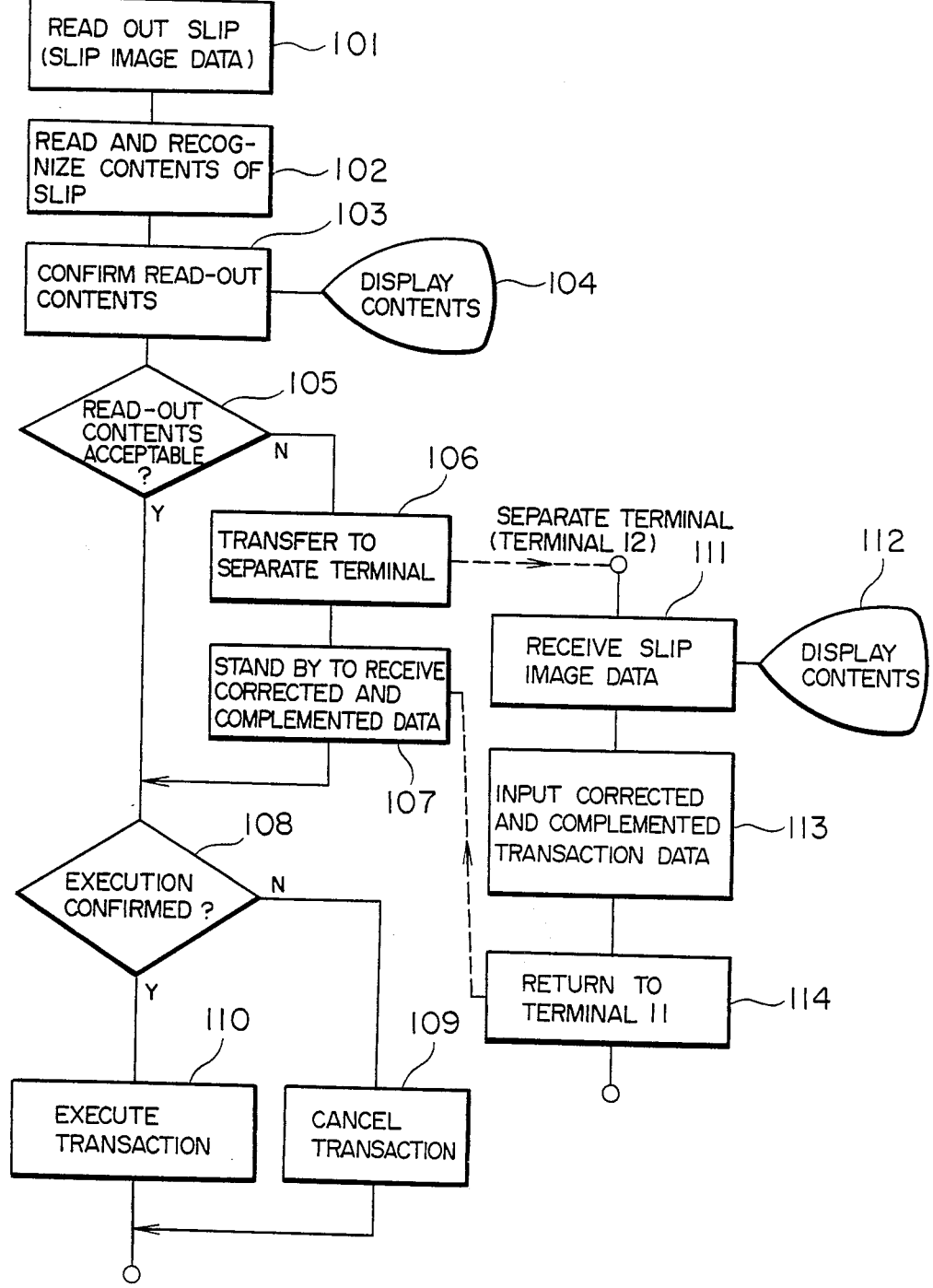
FIG. 1 is a processing flow chart showing an embodiment of the method for recognition of hand-written characters on a transaction slip, according to the present invention.

FIG. 1 is a processing flow chart for recognition of hand-written characters on a transaction slip, and FIG. 4 shows one form of a format of such a transaction slip.

Suppose now that a user who is a customer wants to withdraw money at the terminal device 11 using "an ordinary deposit withdrawal slip" shown in FIG. 4. The user enters required items including his account number, date, amount of money and his name on the slip, and, after stamping his registered stamp, sets the slip in the slip manipulator 32. In the step 101 in FIG. 1, the slip reader 34 reads, under control of the slip read control unit 24, all the items of the format including the hand-written characters from the slip so set to provide slip image data. In the step 102, the slip character recognition unit 25 reads and recognizes the hand-written characters by correlating the slip image data with the font dictionary stored in the file 35. In the step 104, the characters thus read out and recognized are displayed on the display 33 to be reviewed by the user. After it is determined whether or not the withdrawal transaction holds in the step 103, the presence or absence of "misreading", "reject", etc. is checked in the step 105. When the result of checking in the steps 103 and 105 is acceptance and execution of the transaction is confirmed by the user in the step 108, the specific withdrawal transaction is executed in the step 110. However, the transaction is cancelled when reconfirmation by the user does not result.

On the other hand, when there is "misreading", "reject" or the like in the contents read out in the step 102, and checking in the step 105 does not result in acceptance, the transmission data transmit-receive unit 26 sends out the slip image data read out in the step 101 to a pre-specified terminal device (which will be referred to hereinafter as a separate terminal device and which is the terminal device 12 herein) in the step 106. The terminal device 11 stands by until it receives corrected and complemented data transmitted from the separate terminal device 12 in the step 107. The slip image data from the terminal device 11 is transmitted from the interface 36→transmission line 10→interface 56 to the transmission data transmit-receive unit 46 of the terminal device 12. In the terminal device 12, the slip image data is displayed on the display 53 under control of the display control unit 43 in the steps 111 and 112, and an attending clerk visually observes "misreading" or "reject" in the displayed slip image data. In the step 113, the clerk viewing the contents of the displayed slip image data applies necessary correcting and complementing data from the keyboard 51, and, in the step 114, such corrected and complemented data is sent back to the terminal device 11. The user viewing the contents of the slip data altered by the correction and complementing decides whether execution or cancellation of the transaction in the step 108 is to be effected as in the case described already. The "misreading" referred to in the step 102 is detected by visual checking of the result of reading by the user, correlation of the bankbook or card at the time of receipt, logical checking of the account number and amount of memory, etc. On the other hand, the "reject" is detected on the basis of the absence of corresponding characters in the font dictionary stored in the file 35. In the above description, the separate terminal device 12 functions as a correcting and complementing terminal, and reading of the transmitted slip image data is resorted to by employing the visual checking by a clerk. However, such a terminal device may be replaced by a high-accuracy read-only processing unit.

Thus, a transaction slip including "misreading" or "reject" is not returned to the user, and necessary correction and complementing is made in the separate terminal device to complete the transaction. Therefore, it is possible to secure the accuracy of a transaction, to improve the service for a user, to promote realization of slip reading by a computer, and to alleviate the load of a clerk assisting in the procedure for completing a transaction desired by a user who is a customer.

Figure 6:
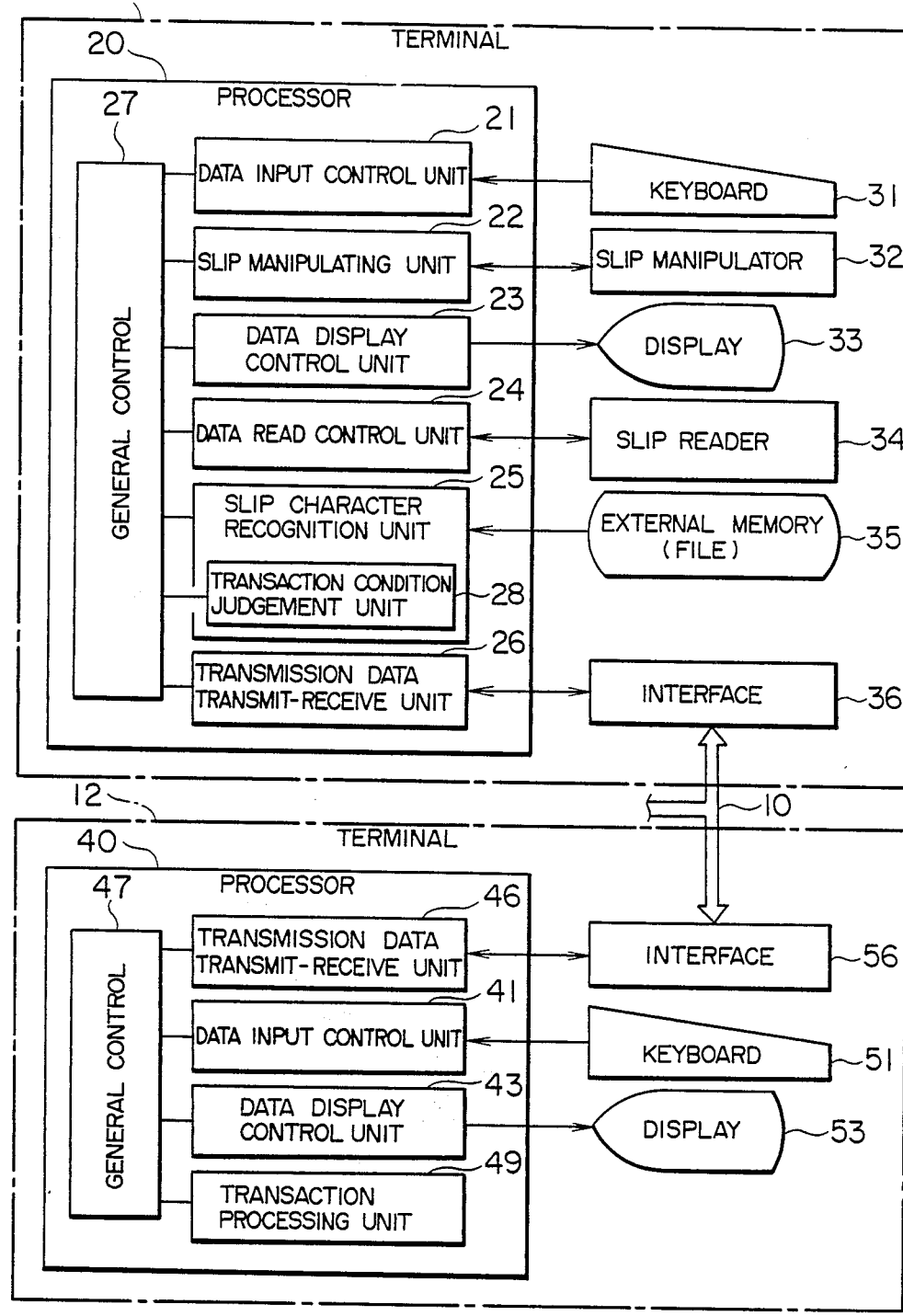
FIG. 6 is a block diagram showing the structure of the terminal devices employed in the second embodiment of the present invention.

FIG. 6 is a block diagram showing the structure of terminal devices employed in the second embodiment of the present invention. Referring to FIG. 6, the processor 20 in the terminal device 11 includes a transaction condition judgment unit 28 judging whether or not slip image data representing the contents of a transaction slip on which characters are hand-written by a user, are to be transmitted to a separate terminal device. FIG. 6 differs from FIG. 3 in that, in addition to the provision of the transaction condition judgment unit 28 described above, the file 35 stores, besides the font dictionary, etc., a table listing conditions for transferring transaction slip data to the separate terminal device which is referenced by the transaction condition judgment unit 28. (This table will be referred to hereinafter as a transaction condition table.) This transaction condition table may be stored in the file 35 of a specific terminal device only or may be stored and managed in the aforementioned large-scale processing unit.

Figure 5:
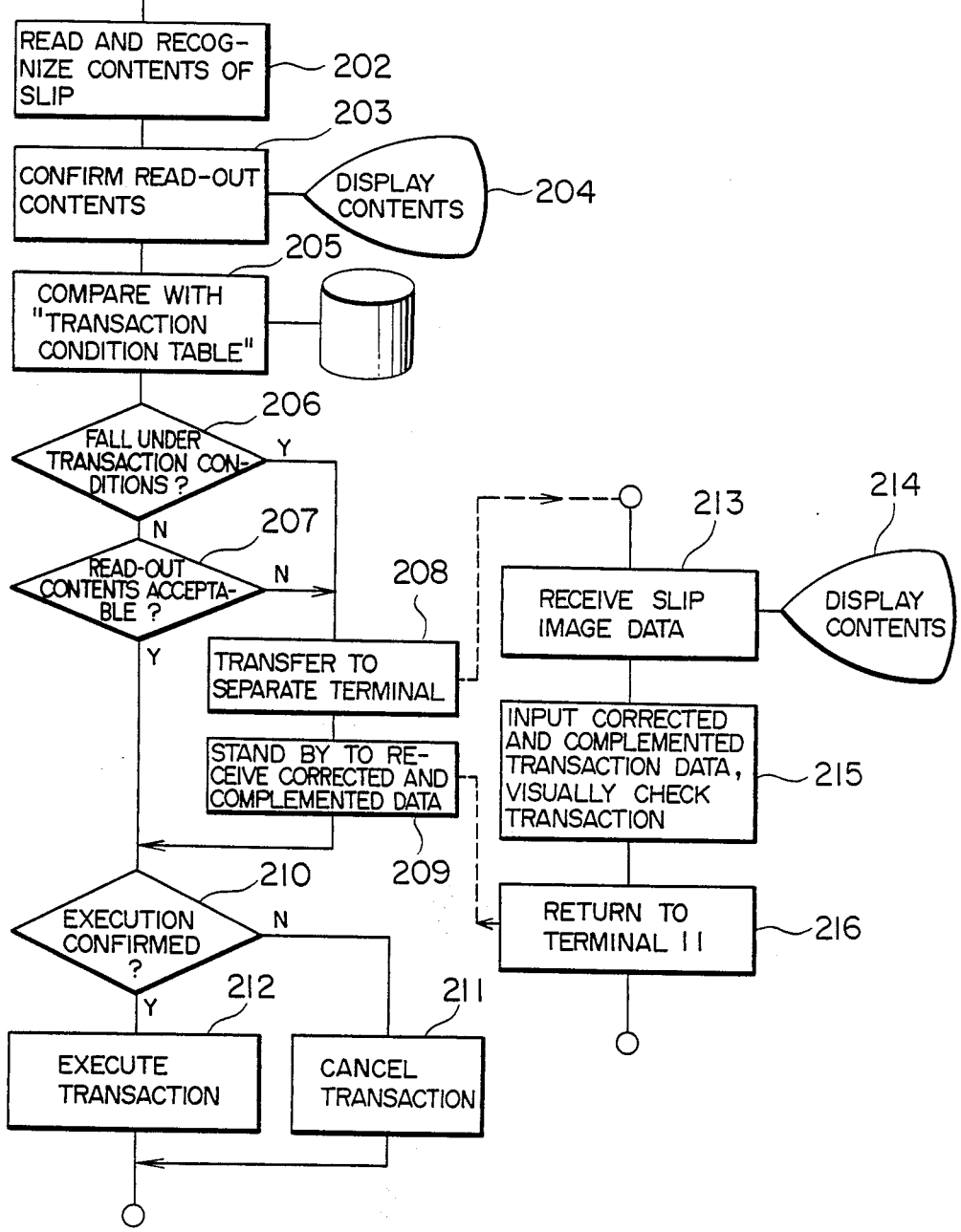
FIG. 5 is a processing flow chart showing another embodiment of the method for recognition of hand-written characters on a transaction slip, according to the present invention.

FIG. 5 is a processing flow chart for recognition of hand-written characters on a transaction slip, and FIG. 7 shows one form of the transaction condition table. FIG. 5 differs greatly from FIG. 1 in that steps 205 and 206 are additionally provided.

Suppose now that a user who is a customer wants to withdraw money at the terminal device 11 using "an ordinary deposit withdrawal slip" shown in FIG. 4. As described already, the user enters his account number, data, amount of money and his name on the slip, and, after stamping his registered stamp, sets the slip in the slip manipulator 32. In the step 201, slip image data is produced on the basis of the set slip as in the case of FIG. 1. The slip image data is correlated with the font dictionary to read out the contents of the transaction in the step 202, and the contents of the transaction are displayed on the display 33 to be viewed by and reported to the user in the step 204. After it is determined whether or not the withdrawal transaction holds in the step 203, the contents of the transaction are compared in the step 205 with the transaction condition table shown in FIG. 7. When the contents of the transaction do not fall under those conditions in the table in the step 206, "misreading" or "reject" is not detected in the step 207, and the execution of transaction is confirmed by the user in the step 210, the specific withdrawal transaction is executed in the step 212. On the other hand, when the confirmation of the execution of transaction by the user does not result, the specific transaction is cancelled in the step 211, as in the case of FIG. 1.

On the other hand, when the conditions of the transaction fall under those conditions of the table in the step 206 or when "misreading" or "reject" is detected in the contents of the transaction in the step 207, the slip image data is transmitted to the separate terminal device (the terminal device 12) in the step 208, and the terminal device 11 stands by until corrected and complemented data or the results of checking of the transaction conditions are transmitted from the separate terminal device 12 in the step 209. The terminal device 12 displays the received slip image data on the display 33 in the steps 213 and 214, and an attending clerk is requested to visually check the transaction conditions or to correct and complement the data to deal with the detected "misreading" or "reject" in the step 215. The data keyed in by the clerk is sent back to the terminal device 11 in the step 216.

The user, observing the contents of the transaction altered to the keyed-in contents, decides upon execution or cancellation of the transaction in the step 210 as described already. The transaction condition table shown in FIG. 7 includes, for example, conditions ID-01 to ID-04. The condition ID-01 specifies a transaction of a large amount of money, as when the amount of withdrawal is equal to or more than 200,000 yens. The condition ID-02 specifies that the user is not a subscriber to the specific branch of the bank, as when the account number of the user differs from those allotted to the specific branch of the bank. The condition ID-03 specifies that the actuation length of time is equal to or more than 3 minutes, as when the terminal devices operated very slowly due to the lack of experience of the user. The condition ID-04 specifies that the number of times of depression of the cancel button is equal to or more than 3, as when the user is not experienced, and the visual check by the clerk is required. The separate terminal device may be modified to deal with the conditions shown in FIG. 7. Thus, the fixed transaction conditions are also checked in the separate terminal device for the present or absence of "misreading" or "reject" as in the case where a transaction is completed by correction and complementing carried out in the separate terminal device. It is therefore possible to secure the accuracy of a transaction, to improve the service for a user, to promote realization of slip reading by a computer and to alleviate the load of a clerk assisting in the procedure for completing a transaction desired by a user who is a customer.

It will be understood from the foregoing detailed description of the present invention that the contents of a transaction in which "misreading" or "reject" is included or which fall under predetermined transaction conditions are transferred to a separate terminal device for the correction and complementing of the contents or checking of the transaction conditions. Therefore, the user (the customer) need not re-enter characters on the transaction slip, and the reliability of the transaction processing system can be improved. In addition, the load of a clerk assisting in the procedure for completing a transaction desired by the user can be alleviated.

We claim:

1. A method for handling transaction slips in a transaction processing system in which at least two terminal devices are connected to a common transmission line to transfer data including the hand-written contents of transaction slips to carry out transactions on the basis of said data, comprising:

reading from a transaction slip data which has been hand-written by a person initiating a transaction on the basis of said transaction slip using a first terminal device, in which the read out data may contain illegible characters;

transferring the data read out by said first terminal device to a second terminal device through said common transmission line at least when the data is misread or rejected in said first terminal device due to the presence of illegible characters in the data;

correcting the data in said second terminal device;

transferring the corrected data from said second terminal device to said first terminal device through said common transmission line;

obtaining an approval for the corrected data from the person initiating the transaction on the basis of said transaction slip in said first terminal device; and indicating that an execution of the transaction based on the corrected data is allowable when the approval is received by said first terminal device from said person.

2. A method according to claim 1, wherein said step of correcting the data in said second terminal device comprises displaying the data received from said first terminal device, viewing the displayed data to detect the correct meaning thereof, and correcting the displayed data to indicate the correct meaning.

3. A method according to claim 1, wherein said step of obtaining approval for the corrected data includes displaying the corrected data at said first terminal device and receiving a signal from said person initiating the transaction indicating whether the displayed corrected data is approved.

4. A method for handling transaction slips in a transaction processing system in which at least two terminal devices are connected to a common transmission line to transfer data including the hand-written contents of transaction slips to carry out transactions on the basis of said data, comprising:

reading from a transaction slip data which has been hand-written by a person initiating a transaction on the basis of said transaction slip using a first terminal device in which the read out data may contain illegible characters;

comparing at least a portion of the read out data indicating a condition of the transaction with a predetermined condition;

transferring the data read out by said first terminal device to a second terminal device through said common transmission line at least when the data is misread or rejected in said first terminal device due to the presence of illegible characters in the data or when the condition of the transaction corresponds to the predetermined condition;

correcting the data in said second terminal device;

approving the transaction in said second terminal device;

transferring the correct and/or approved data from said second terminal device to said first terminal device through said common transmission line;

obtaining an approval for the corrected data from the person initiating the transaction on the basis of said transaction slip in said first terminal device; and indicating that an execution of the transaction based on the corrected data is allowable when the approval is received by said first terminal device from said person.

5. A method according to claim 4, wherein said step of correcting the data in said second terminal device comprises displaying the data received from said first terminal device, viewing the displayed data to detect the correct meaning thereof, and correcting the displayed data to indicate the correct meaning.

6. A method according to claim 5, wherein said step of obtaining approval for the corrected data includes displaying the corrected data at said first terminal device and receiving a signal from said person initiating the transaction indicating whether the displayed corrected data is approved.

7. An apparatus for handling transaction slips in a transaction processing system in which at least two terminal devices are connected to a common transmission line to transfer data including the hand-written contents of transaction slips to carry out transactions on the basis of said data, comprising:

means for reading from a transaction slip data which has been hand-written by a person initiating a transaction on the basis of said transaction slip in a first terminal device in which the read out data may contain illegible characters;

means for the data read out by said first terminal device to a second terminal device through said common transmission line at least when the data is misread or rejected in said first terminal device due to the presence of illegible characters in the data;

means for correcting the data in said second terminal device;

means for transferring the corrected data from said second terminal device to said first terminal device through said common transmission line;

means for obtaining an approval for the corrected data from the person initiating the transaction on the basis of said transaction slip in said first terminal device; and means for indicating that an execution of the transaction based on the corrected data is allowable when the approval is received by said first terminal device from said person.

8. An apparatus according to claim 7, wherein said correcting means in said second terminal device includes a high accuracy read-only processing unit having a higher degree of operating accuracy than said data reading means in said first terminal device.

9. An apparatus for handling transaction slips in a transaction processing system in which at least two terminal devices are connected to a common transmission line to transfer data including the hand-written contents of transaction slips to carry out transactions on the basis of said data, comprising:

means for reading from a transaction slip data which has been hand-written by a person initiating a transaction on the basis of said transaction slip in a first terminal device in which the read out data may contain illegible characters;

means for comparing at least a portion of the read out data indicating a condition of the transaction with a predetermined condition;

means for transferring the data read out by said first terminal device to a second terminal device through said common transmission line at least when the data is misread or rejected in said first terminal device due to the presence of illegible characters in the data or when the condition of the transaction corresponds to the predetermined condition;

means for correcting the data in said second terminal device;

means for approving the transaction in said second terminal device;

means for transferring the correct and/or approved data from said second terminal device to said first terminal device through said common transmission line;

means for obtaining an approval for the corrected data from the person initiating the transaction on the basis of said transaction slip in said first terminal device; and means for indicating that an execution of the transaction based on the corrected data is allowable when the approval is received by said first terminal device from said person.

10. An apparatus according to claim 9, wherein said correcting means in said second terminal device includes a high accuracy read-only processing unit having a higher degree of operating accuracy than said data reading means in said first terminal device.

* * * * *